United States Patent [19]
Yorgason

[11] Patent Number: 5,280,706
[45] Date of Patent: Jan. 25, 1994

[54] COMPOSITE/METAL HYBRID ROCKET MOTOR CASE AND METHODS FOR MANUFACTURING

[75] Inventor: James A. Yorgason, Ogden, Utah
[73] Assignee: Thiokol Corporation, Ogden, Utah
[21] Appl. No.: 903,852
[22] Filed: Jun. 25, 1992
[51] Int. Cl.$^5$ .............................................. F02K 9/00
[52] U.S. Cl. ..................................... 60/255; 220/414; 102/481
[58] Field of Search ............... 60/253, 255; 156/172; 220/414; 102/481

[56] References Cited

U.S. PATENT DOCUMENTS

| | | | |
|---|---|---|---|
| 2,724,672 | 11/1955 | Rubin | 154/82 |
| 3,513,051 | 5/1970 | Lichfield | 156/242 |
| 3,962,506 | 6/1976 | Dunahoo | 428/158 |
| 3,967,996 | 7/1976 | Kamov et al. | 156/156 |
| 3,973,397 | 8/1976 | Chase et al. | 60/253 |
| 4,123,307 | 10/1978 | Lemelson | 156/172 |
| 4,169,749 | 10/1979 | Clark | 156/156 |
| 4,292,101 | 9/1981 | Reichert | 156/156 |
| 4,458,595 | 7/1984 | Gerrish et al. | 60/253 |
| 4,565,595 | 1/1986 | Whitener | 156/156 |
| 5,035,180 | 7/1991 | Purcell et al. | 60/253 |

FOREIGN PATENT DOCUMENTS 746214  3/1956  United Kingdom ............... 60/253

Primary Examiner—Richard A. Bertsch
Assistant Examiner—W. J. Wicker
Attorney, Agent, or Firm—Madson & Metcalf

[57] ABSTRACT

A composite/metal hybrid rocket motor case made by rolling sheets of continuous, unidirectional fiber reinforcement pre-impregnated with an uncured, thermoset or thermoplastic resin about the mandrel using a tube rolling machine to form a liner having discontinuous layers of fiber reinforcement. The liner is inserted into a metal shell configured with elongated slots. A mold is placed around the shell with a bladder placed within the liner. The bladder within the mold is then pressurized to force the liner against the metal shell while the contents of the mold are heated. As the liner cures, it bonds to the shell. Fins, launch lugs, domes and bulkheads may be attached to the metal shell by known attachment methods.

17 Claims, 5 Drawing Sheets

COMPOSITE/METAL HYBRID ROCKET MOTOR CASE AND METHODS FOR MANUFACTURING

ORIGIN OF THE INVENTION

This invention was made with government support under U.S. Navy contract number N 60530-91-C-0254. The government has certain rights in the invention.

BACKGROUND

1. The Field of the Invention

The present invention is related to a hybrid rocket motor case constructed of a metal shell and a fiber reinforced composite liner and methods for manufacturing such a case. More particularly, the present invention is related to an improved rocket motor case constructed of a slotted metal shell to which is bonded a plurality of sheets of continuous, unidirectional fiber reinforcement, bonded together by a thermoset or thermoplastic matrix material and methods for manufacturing.

2. Technical Background

Historically, rocket motor cases have generally been made of metal. Metal cases have traditionally been favored because of their inherent toughness and versatility. A variety of end closures and fin attachments can be easily mounted to a metal case, making metal cases suitable for many applications. Also, metal cases can be quickly and inexpensively manufactured. Thus, metal cases have generally provided excellent performance and versatility at an acceptable cost.

However, if a rocket motor having a metal case is inadvertently ignited either through exposure to high temperatures or through bullet or fragment impact, a metal case has the potential of containing substantial pressure. Consequently, ignition pressure will escape through the rocket nozzle, generating substantial thrust, propelling the burning rocket motor or substantial pieces thereof. The dangers to crew and equipment resulting from the inadvertent ignition of rocket motors having a metal case are obvious.

As a result of these dangers, tests to determine the sensitivity of rocket motors to conditions which may cause unplanned ignition of rocket motors have been developed. Munitions successfully passing such tests are generally categorized as "Insensitive Munitions." Thus, Insensitive Munitions tests attempt to measure the sensitivity of a rocket motor to cookoff, and bullet and fragment impact.

Because the sensitivity of a rocket motor is greatly affected by the design of the motor case, various case designs have been generated in an attempt to develop a case which minimizes violence resulting from bullet and fragment impact, and mitigates reaction to both slow and fast cookoff. Unfortunately, such designs frequently result in a reduction in performance of the rocket motor.

One design which is generally recognized as providing an acceptable combination of performance and insensitivity is a filament wound composite case. Such a case is prepared by employing a high-strength, continuous reinforcing filament, such as graphite, impregnated with a graphite or epoxy resin. The case is formed by winding the filament in a predetermined pattern about a mandrel configured according to the desired interior dimensions of the case. The pattern of the winding is selected to provide the required strength in the case. The resin is then cured and the mandrel removed from the case.

By properly designing the pattern of the winding, acceptable hoop and axial strength can be obtained, providing the necessary case pressure capability in a case weighing much less than a corresponding metal case. Such composite cases perform well in Insensitive Munitions tests. In cookoff tests, thermal degradation is predictable at fairly low temperatures, depending on the resin employed in constructing the case. Bullet and fragment impact tests cause the cured composite to fracture or delaminate. Any initial pressure buildup within the case, such as that resulting from ignition of the propellant, will cause further breakage of the case thereby eliminating the possibility of any significant pressure buildup within the case.

Filament wound composite cases, however, do not provide an optimal design. In many tactical applications, the case must be attached beneath the wing of an aircraft. During flight, the case may be exposed to a variety of conditions, including substantial heat on the exterior skin of the rocket motor resulting from the friction of air passing along the case at high velocities. Such friction-generated heat is an even greater problem during flight of the rocket itself, where velocities in excess of Mach 3 can be achieved. As can be predicted by the performance of composite cases in cookoff tests, the skin of the rocket motor will begin to thermally degrade when exposed to such extreme temperatures.

Composite cases suffer from additional disadvantages in that fins, launch lugs, domes, bulkheads and other attachment devices which may form a necessary part of the case, are generally configured such that they cannot be formed in the case during the initial manufacturing process. Thus, these parts must be attached to the composite case through other means. Because of the inherent physical properties of the composite material of which the case is made, problems relating to the attachment of these parts to the composite case must be overcome.

Attachment methods successfully used for metal cases, such as welding or securing with nuts and bolts, cannot be utilized when the case is made of a composite material. Any holes drilled in the composite case to accommodate screws, for example, will form stress risers. Hence, a much greater thickness of composite must be employed to support the stresses which result from pressurization and flight loads on the case. Thus, when working with composites, the attachment of fins, end closures and other parts is generally accomplished by bonding the parts to the case with an adhesive. However, bonding with an adhesive is generally a less reliable method of attachment than those methods available for use with a metal case.

An additional concern when working with composite rocket motor cases is their lack of durability. Whereas metal cases are quite resistant to damage, composite cases are easily susceptible to breakage. Rocket motor cases may be subject to abuse resulting from a variety of sources and must be capable of withstanding substantial impact forces. As would be predicted by their performance in bullet and fragment impact tests, composite cases are easily weakened when subjected to impact forces. Thus, the fragile nature of the composite case, while positively contributing to the case's insensitivity, adversely affects its practical utility and durability.

The construction of filament wound cases requires substantial manufacturing time, the bulk of which is dedicated to winding the filament about the mandrel. The machinery to accomplish the winding is necessarily complex in order to be able to accurately lay the filament in the prescribed pattern. Additionally, the materials cost for manufacturing a composite case are higher than for a metal case. Consequently, another significant disadvantage to filament wound cases is that they are more expensive than corresponding metal cases.

Thus, it would be an advancement in the art to provide a rocket motor case which could pass Insensitive Munitions cook-off tests and could withstand the heat generated at the skin of the rocket case as a result of substantial velocities of travel.

It would be a further advancement in the art to provide a rocket motor case which could pass Insensitive Munitions bullet or fragment impact tests and still possess the durability to be damage resistant when subjected to the handling abuses and impact forces which such rocket motors typically have to endure.

It would be an additional advancement in the art to provide a rocket motor case which would be light weight, thereby facilitating the handling of the rocket motor, yet maintaining the strength required to assure acceptable performance.

It would be another advancement in the art to provide a rocket motor to which fins, end closures and other attachable parts could be easily and readily attached utilizing known, reliable attachment methods.

It would be yet a further advancement in the art to provide methods of manufacturing a rocket motor which minimize labor time and materials cost and which avoid the utilization of complex and expensive machinery.

Such an apparatus and method for manufacturing is disclosed and claimed herein.

BRIEF SUMMARY AND OBJECTS OF THE INVENTION

The present invention is directed to a novel case for a rocket motor and methods of manufacturing the case. The case includes a generally cylindrical, metal shell which is configured with a plurality of slots. Attached within the shell is a cylindrical liner made from a plurality of sheets of continuous, unidirectional fiber reinforcement bonded together by a thermoset or thermoplastic matrix material. The sheets of fiber reinforcement may be oriented in a variety of directions to provide the hoop and axial strength required in the case. Fin attachments may be provided on the metal exterior in accordance with known attachment methods. The ends of the case may be configured to accommodate the attachment of end closures by conventional means.

The method of manufacturing the rocket motor case includes rolling a sheet of continuous, unidirectional fiber reinforcement which has been pre-impregnated with an uncured, thermoset or thermoplastic resin about a mandrel using a conventional tube rolling machine. The fiber reinforcement within each sheet is said to be "continuous" because the fibers extend along the entire length of each sheet without interruption.

A number of sheets are rolled about the mandrel, layered upon one another, to form a composite tube, or liner, of desired thickness. The resulting composite liner is thus composed of discontinuous layers of reinforcement. The composite liner of the present invention is said to be reinforced with "discontinuous" layers because the fibers reinforcing any given sheet within the liner are separate from the fibers reinforcing other sheets. This is contrasted to a liner made by a filament wound method in which several layers of fibers are wound about a mandrel to form the liner such that each layer of fiber reinforcement is a continuation of the fiber reinforcement making up all other layers within the liner.

The composite sheets within the liner may be oriented in various directions such that the fiber reinforcement provides hoop and axial strength to the case. While on the tube rolling machine, the liner is preferably warmed by heating the mandrel of the machine, thereby decreasing the viscosity of the resin within the sheets and causing them to adhere to one another more readily as the tube is being formed.

After the desired number of sheets have been rolled about the mandrel on the tube rolling machine to form the liner, the liner is removed from the mandrel and inserted into a metal shell which has been uniformly configured with a plurality of elongated slots with their length oriented axially along the metal shell. At this point, a cylindrically shaped layer of insulation may be placed within the liner. An expandable bladder is then placed within the insulative layer and a mold is affixed around the metal shell to prevent the resin in the liner from leaking through the slots in the metal shell while the resin is being cured.

The expandable bladder within the mold is initially pressurized a sufficient amount to expand the bladder and force the liner against the interior surface of the metal shell. The components of the case are then heated to a temperature at which the resin will consolidate and cure. Once heated, the pressure within the bladder is increased to firmly press the composite liner against the interior of the metal shell and force any entrapped air along the bonding surfaces to escape, thereby permitting the entire interior surface of the shell to bond to the liner as the resin within the liner cures.

The temperature and pressure within the mold are maintained until the resin in the composite liner has cured, thereby bonding the liner to the metal shell and to the insulative layer. Once the resin has completely cured, the completed case is removed from the mold.

The resulting composite/metal hybrid rocket case thus incorporates the advantages of each material. Because the ends of the case are metal, they may be configured with threads or other conventional attachment means for attachment to end closures. Also, because the outside of the case is metal, conventional fins may be attached to the case by conventional attachment mechanisms.

The metal exterior of the case also provides resistance to damage from impact forces to which rocket motors are frequently subjected. Additionally, the metal shell readily withstands the heat generated on the exterior surface of the rocket motor by the friction of air passing along the exterior surface as a result of the substantial velocities of travel of the rocket motor.

The slots in the metal shell destroy virtually all of the hoop strength in the shell. Virtually all of the hoop strength of the case is thus supplied by the composite liner. By eliminating the hoop strength of the metal shell, the hybrid case is incapable of maintaining case pressure in the event of inadvertent ignition, such as could occur under circumstances simulated by Insensitive Munitions tests. Under such circumstances, the composite liner will degrade, thereby eliminating the hoop strength of the case and preventing case pressure from building.

Significantly, tests of a discontinuously reinforced composite liner made according to the teachings of the present invention indicate that it has substantially the same strength as a similarly sized liner made of a filament wound, continuously reinforced, composite. Thus, the composite liner provides the case with virtually all of its hoop strength and a substantial portion of its axial strength.

Consequently, by employing the discontinuously reinforced composite liner in combination the slotted metal shell to form the rocket motor case, the wall thickness of the metal shell can be substantially reduced over that of an all-metal case. Hence, the total weight of the hybrid case is significantly less than that of a conventional all-metal case.

Thus, it is an object of the present invention to provide a rocket motor case which will pass Insensitive Munitions cookoff tests and will withstand the heat generated at the skin of the rocket case as a result of the friction caused by the substantial velocities of travel of the rocket case.

It is a further object of the present invention to provide such a rocket motor case which will pass Insensitive Munitions bullet or fragment impact tests and has the durability to be damage resistant when subjected to the handling abuses and impact forces which such rocket motors typically have to endure.

It is an additional object of the present invention to provide a rocket motor case which is light weight, thereby facilitating the handling of the rocket motor, while maintaining the strength required to provide acceptable performance.

Another object of the present invention is to provide a rocket motor to which fins, end closures and other attachable parts could be easily and readily attached utilizing known, reliable attachment methods.

It is yet a further object of the present invention to provide methods of manufacturing a rocket motor which minimize labor time and materials cost and which avoid the utilization of complex and expensive machinery.

These and other objects and advantages of the present invention will become more fully apparent by examination of the following description of the preferred embodiments and the accompanying drawings.

DETAILED DESCRIPTION OF THE PREFERRED EMBODIMENTS

Figure 1:
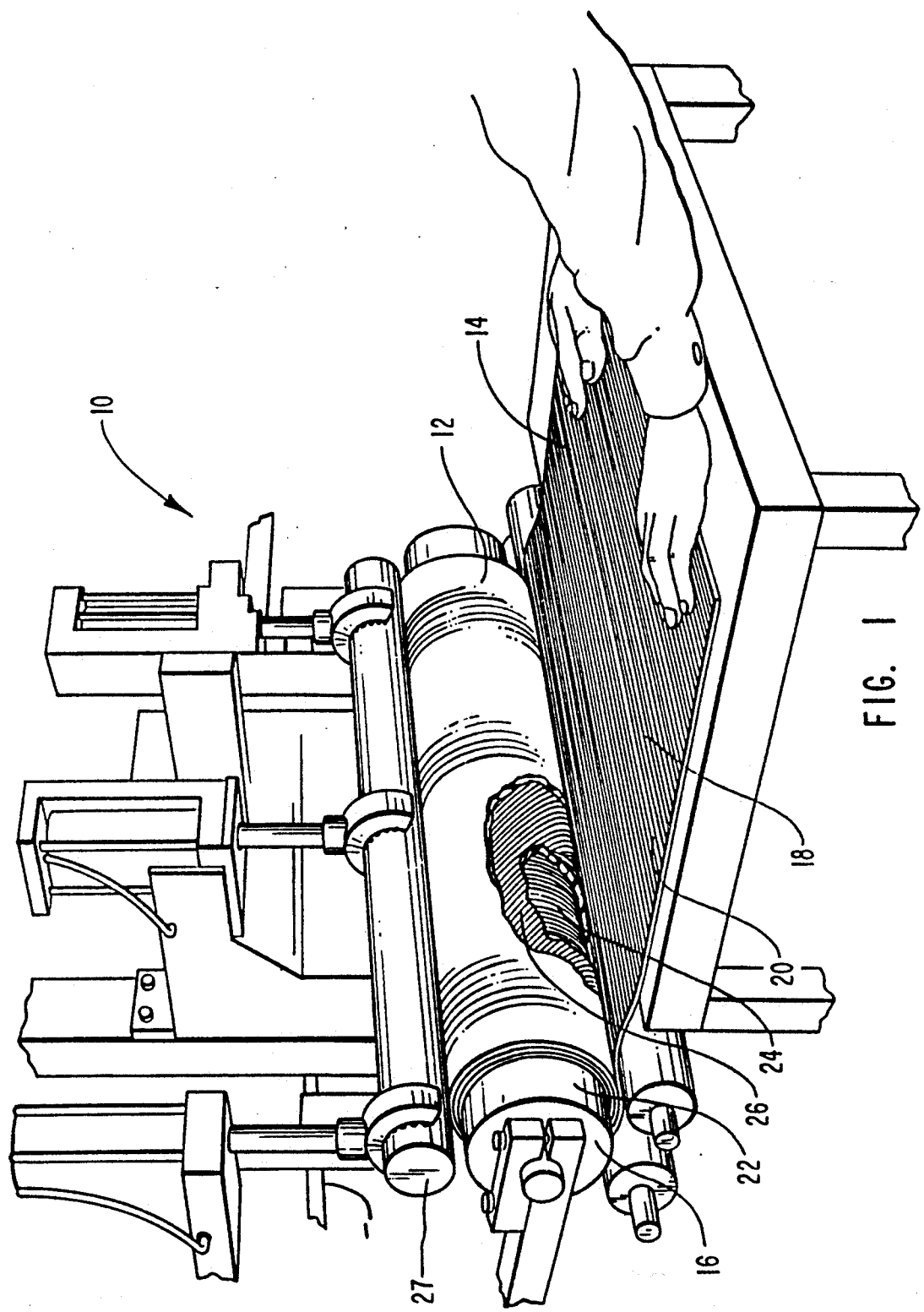
FIG. 1 is a perspective view of a composite liner being formed on a tape rolling machine, in accordance with the method of the present invention.

Reference is now made to the FIGURES wherein like parts are referred to by like numerals throughout. With particular reference to FIG. 1, the manufacturing process of the composite liner used to form the hybrid rocket motor case in accordance with the teachings of the present invention is explained. In FIG. 1, a conventional tube rolling machine 10 is illustrated as being used to form a composite liner 12.

The liner 12 is formed by rolling sheets 14 of composite material about a mandrel 16 of the tube rolling machine 10. Sheets 14 are made of uncured fiber reinforced plastic. In a preferred embodiment of the invention, sheets 14 comprise continuous, unidirectional fiber reinforcement which has been preimpregnated with an uncured, thermoset or thermoplastic resin. Such sheets 14 are commercially available in long rolls and are commonly referred to as "fiber reinforced pre-preg tape" or "FRP tape." The sheets generally range in thickness from about 0.004 inches to about 0.020 inches. The continuous fiber reinforcement 18 within the sheets 14 may include any of those conventionally known in the art of composite materials, such as graphite, glass or Kevlar.

The uncured resin 20 utilized in the sheets 14 may include any of those thermoset or thermoplastic resins suitable for use in composite, fiber-reinforced materials. For example, pre-preg epoxy resins marketed by Amoco Performance Products as "ERL-1908" and "934" and "974" pre-preg epoxy resins marketed by Fiberite, Corp. are presently believed to be acceptable resins for use in accordance with the teachings of the present invention.

The fiber reinforcement 18 within each sheet 14 is referred to herein as being "continuous" because each length of fiber extends without interruption from one end of the sheet 14 to the other. The fiber reinforcement within the liner 12 is referred to herein as being "discontinuous" because the fibers from one sheet within the liner are not connected to the fibers of adjacent sheets. An example of a continuously reinforced liner would be a filament wound composite liner in which the reinforcing filament extends throughout all layers of the liner without interruption.

To aid in removing the liner 12 from the mandrel 16, a release material 22 is initially applied to the mandrel 16. A nylon film dusted with talc has been found to act as a suitable release material 22.

Figure 2:
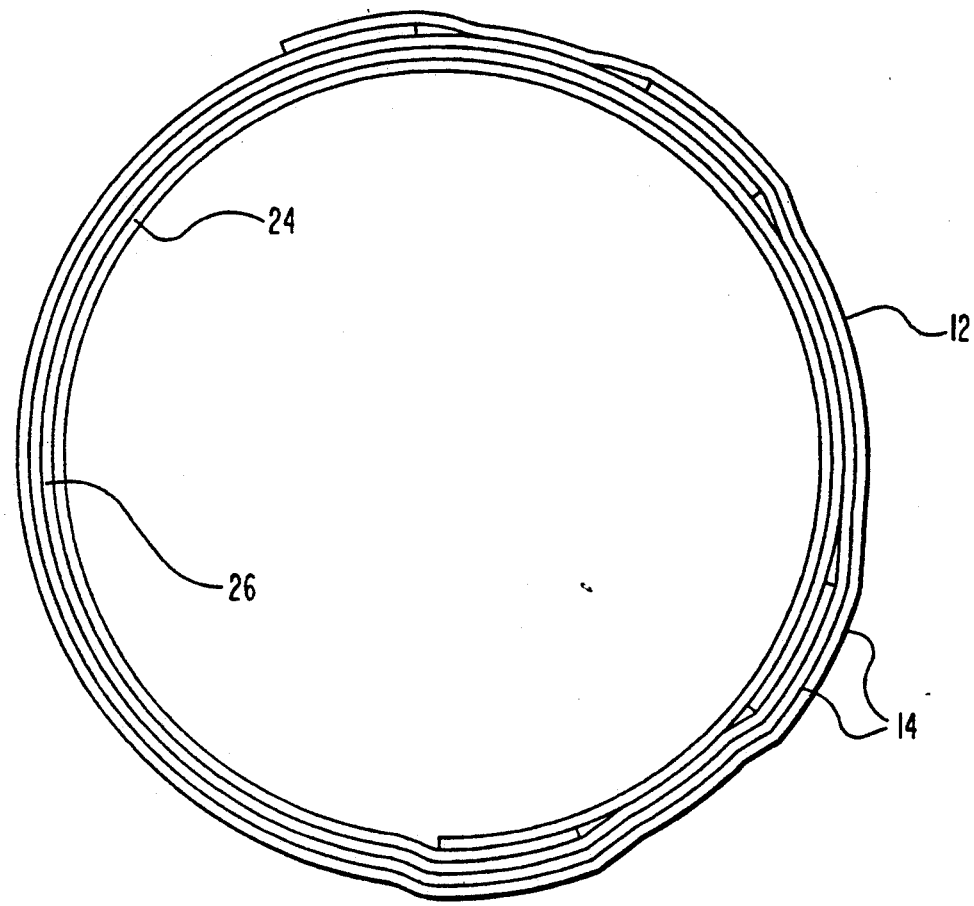
FIG. 2 is an end view of the composite liner of FIG. 1.

The mandrel 16 of the tube rolling machine 10 rotates as the sheets 14 are fed onto it. Each sheet is sized such that when it is fed onto the mandrel 16, it will overlap upon itself, as best viewed in FIG. 2. For example, when preparing an eight-inch diameter liner, it is preferred that each sheet 14 overlap upon itself 1½ to 2 inches, thereby providing sufficient area for bonding of each sheet 14 back upon itself.

After one sheet 14 is fed entirely onto the mandrel 16, the mandrel is then rotated away from the overlap area before feeding in the next sheet. With the addition of further sheets 14, the mandrel 16 is preferably rotated such that areas of overlap of the sheets 14 are staggered about the circumference of the liner 12, as viewed in FIG. 2. Thus, the possibility of buildup of the composite material along any portion of the perimeter of the liner 12 due to stacking of the overlapped portion of the sheets 14 is reduced.

Each sheet 14 is fed into the tube rolling machine 10 with its unidirectional fiber reinforcement 18 oriented to provide the structural support desired in the liner 12. Because unidirectional fiber-reinforced composite materials only supply a significant level of stiffness in the direction of the fibers, the sheets 14 utilized in making the liner 12 must be variously oriented such that the resulting liner 12 has the required hoop strength and axial stiffness.

As illustrated in FIG. 1, for example, layer 24 is circumferentially oriented to provide the liner 12 with hoop strength. Of course, sheets 14 may also be cut such that the fiber reinforcement 18 is at an angle to the axis of the liner 12, thereby providing a component of strength in both the axial and the circumferential directions. For example, layer 26 of the liner 12 illustrated in FIG. 1 is oriented off axis to provide both hoop strength and axial stiffness. Generally, the composite liner 12 will supply virtually all of the hoop strength of the hybrid rocket motor case. Hence, there must be a substantial component of strength in the circumferential direction supplied to the hybrid rocket motor case by the composite liner 12.

It is presently believed that a composite liner 12 having superior mechanical properties may be achieved by varying the orientation of each successive sheet 14. By changing the orientation of each successive sheet 14, the strength of one layer will supplement the strength of other layers, thereby producing a composite liner having the desired strength. Of course, one of ordinary skill in the use of composite materials will appreciate that the orientation of the sheets 14 may vary according to the specific design requirements of the rocket motor case being manufactured.

In a presently preferred embodiment of the invention, approximately 14 layers of FRP tape are utilized in rolling the liner 12. A typical liner 12 could have a wall thickness in the range of approximately 0.040 to 0.25 inches.

In accordance with a presently preferred method, the mandrel 16 is heated during the tube rolling process. As the sheets 14 are rolled onto the mandrel 16, heat transfer between the mandrel 16 and the sheets 14 will cause the temperature of the uncured resin 20 in the sheets 14 to rise. As the temperature of the resin 20 rises, its viscosity decreases. Thus, by heating mandrel 16 during the tube rolling step, the sheets 14 become sticky and easily adhere to one another and to themselves at the overlap, thereby facilitating the tape rolling process. The precise temperature to which the mandrel is heated is therefore a function of the physical properties of the resin 20 employed in the sheets 14. A compaction roller 27 may be utilized to aid in pressing the sheets 14 together to form the liner 12.

The tube rolling process described herein for constructing an eight-inch diameter, discontinuously reinforced, composite liner 12 can be accomplished in approximately 10 to 15 minutes. Preparing a similarly shaped and sized, continuously reinforced, composite liner in accordance with a filament winding process requires four to six hours with the same number of operators. When including all steps required to produce the composite liner, the time required to produce the liner in accordance with the methods of the present invention is approximately 4.5 hours. Approximately 11 hours are required, however, when utilizing conventional filament winding processes. Thus, the tube rolling process utilizing sheets of composite results in a substantial savings of time over the prior-art filament winding process.

After the desired number of sheets 14 have been wrapped about the mandrel 16 on the tube rolling machine 10 to form a liner 12, the liner 12 is removed from the mandrel 16. The release material 22 may then be removed from the liner 12. The liner 12 is now ready to be combined with a metal shell 30, as illustrated in FIG. 3, to form a composite/metal hybrid rocket motor casing.

Figure 3:
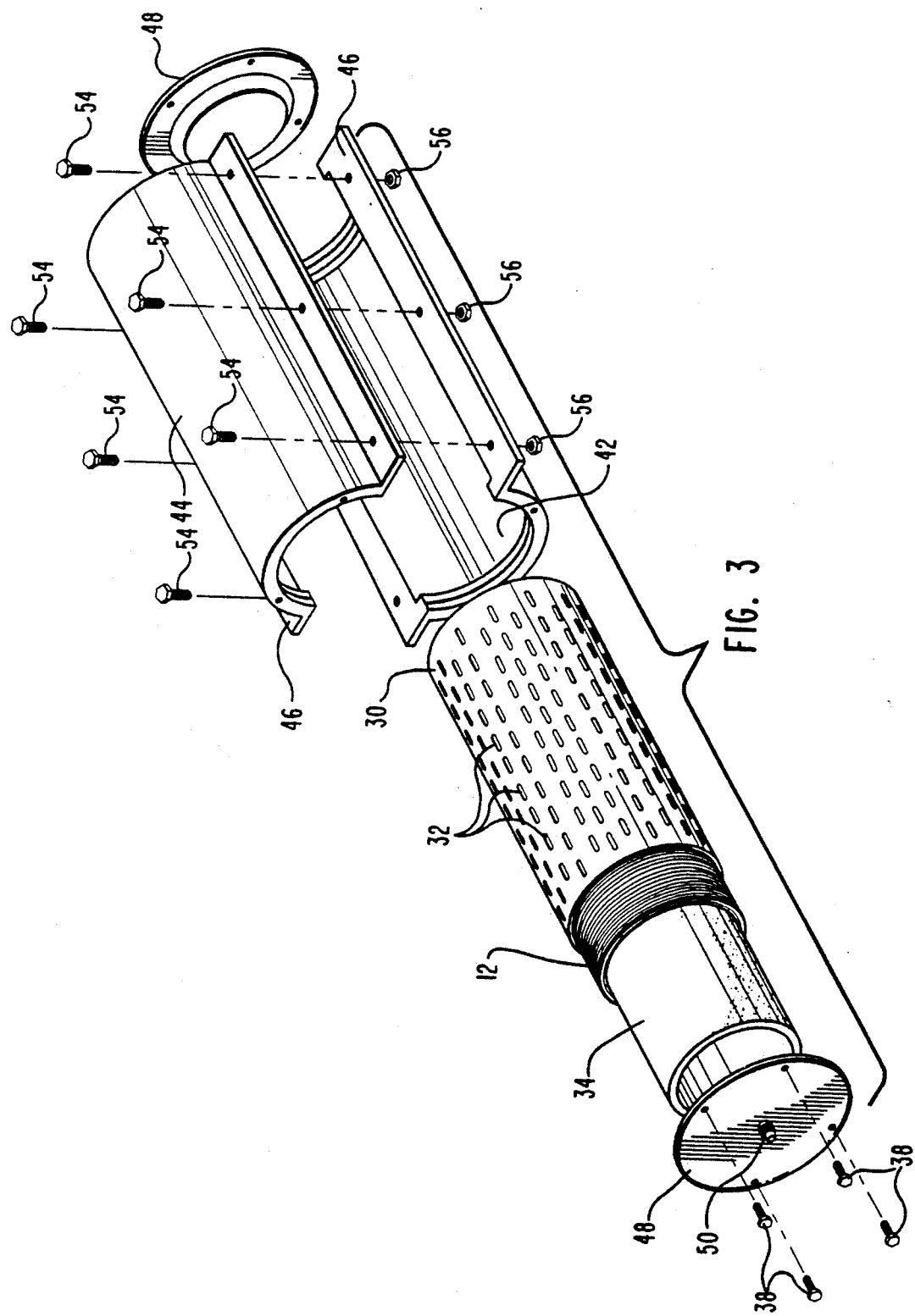
FIG. 3 is an exploded perspective view of one embodiment of the hybrid rocket case of the present invention illustrated with a mold used in curing the liner.

With reference now to FIG. 3, metal shell 30 may be constructed out of any of a variety of metals, including those conventionally known and used in the manufacture of rocket motor cases, such as steel, aluminum and titanium. In a presently preferred embodiment of the invention, metal shell 30 is constructed of steel alloy 4130.

When combined with the metal shell 30 to form the hybrid rocket motor case of the present invention, the composite liner 12 will provide significant structural support to the case. In a preferred embodiment of the invention, the composite liner 12 will provide virtually all of the hoop strength and approximately half of the axial stiffness required of the hybrid rocket motor case. Hence, the wall thickness of the metal shell 30 may be substantially reduced over that utilized in conventional metal rocket motor cases in which the metal case must supply all of the hoop and axial strength of the case.

Metal shell 30, such as that illustrated in FIG. 3, is prepared for combination with the liner 12 by configuring it with a plurality of slots 32. Slots 32 are provided in the shell 30 to minimize pressure containment in the case in the event of unintentional ignition of the rocket motor from impact or cookoff events, thereby contributing significantly to the insensitivity of a rocket motor made from the hybrid case.

Slots 32 penetrate the entire wall thickness of the shell 30 and extend around the entire surface of the shell 30. Preferably, slots 32 are uniformly distributed throughout the shell 30. Although no particular pattern is presently preferred, the slots should permit the shell 30 to retain a substantial degree of axial stiffness.

The principal purpose of the slots 32 is to destroy the circumferential strength capability of the metal shell 30. Hence, slots 32 are preferably elongated and are configured such that their length is oriented along the axis of the metal shell 30, as illustrated in FIG. 3.

Figure 4:
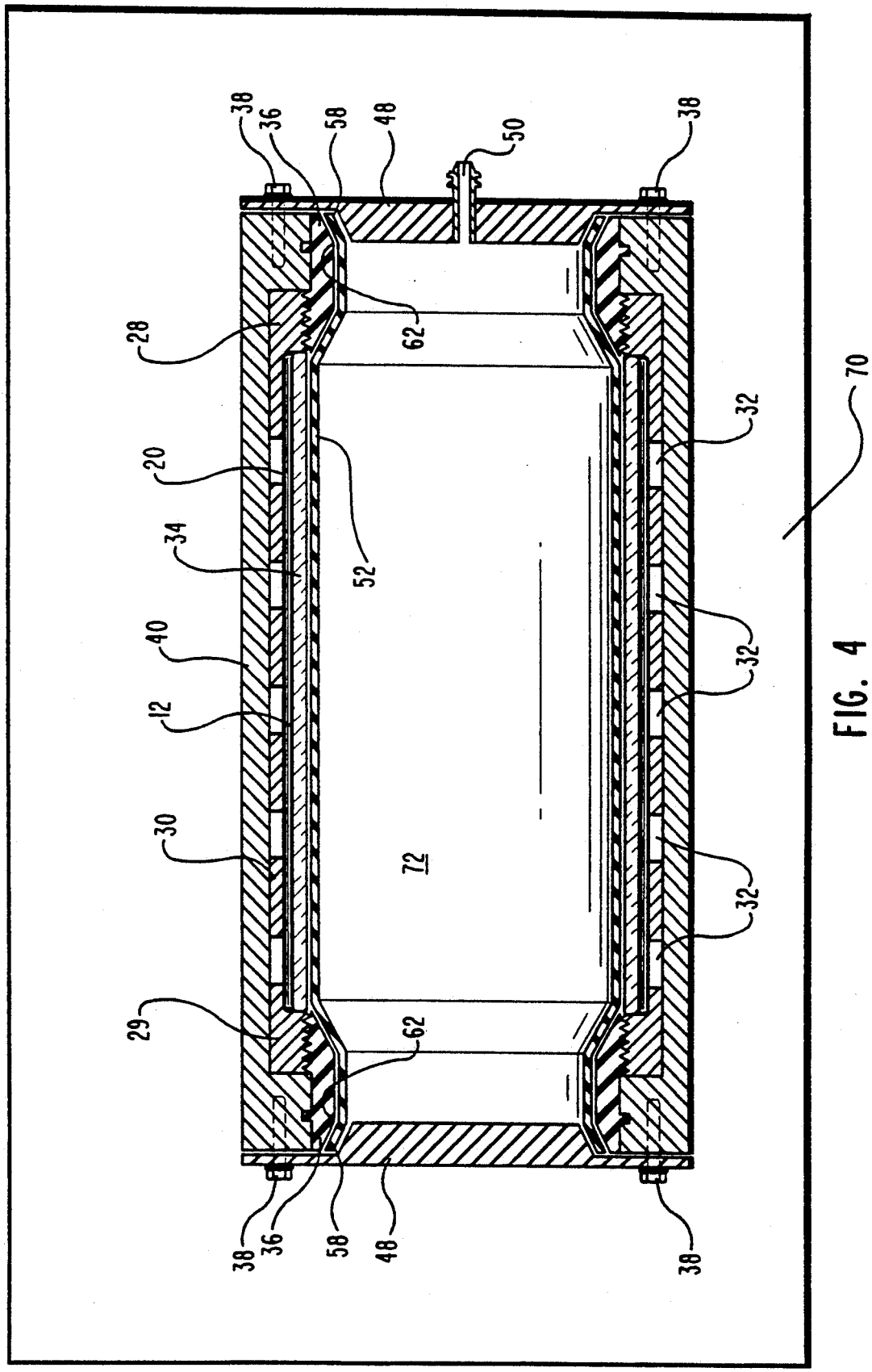
FIG. 4 is a cross-sectional view of an embodiment of the hybrid rocket case of the present invention positioned in a mold during a portion of the manufacturing process of the case.

As best viewed in FIG. 4, the forward end 28 of shell 30 is preferably configured for attachment to a payload which will depend on the application for which the rocket motor is to be used. Such a payload may include, for example, an explosive composition and a guidance system. The aft end 29 of the motor will typically attach to a nozzle or a tail segment including fins. The described embodiment is illustrated with ends 28 and 29 configured with threads, as is commonly known in the art. One of skill in the art will appreciate that ends 28 and 29 could be configured to accommodate a variety of conventional attachment mechanisms.

With reference again to FIG. 3, after the metal shell 30 has been prepared with slots 32, it is bonded to the composite liner 12 to form the completed rocket motor case. The liner 12 is prepared for bonding to the metal shell 30 by inserting the liner 12 within the shell 30, as is illustrated in FIG. 3.

A layer of insulation 34 is preferably inserted within the liner 12 to be bonded to the liner 12 concurrently with the bonding of the liner 12 to the metal shell 30. Insulation 34 protects the liner 12 from the extreme heat generated when the rocket motor is fired. Alternatively, the layer of insulation 34 may be attached to the liner 12 after the liner 12 has been bonded to the metal shell 30; however, it has been found that the insulation 34 may be included within the rocket motor case most efficiently by bonding it to the liner 12 concurrently with the bonding of the liner 12 to the metal shell 30. Insulation 34 may include any of those insulative materials conventionally employed in the art of solid-propellant rocket motors as a case insulator.

The component parts of the case, including the metal shell 30, the liner 12 and the layer of insulation 34, are then preferably inserted within a mold 40. Mold 40 may employ a variety of configurations. It is presently preferred, however, that mold 40 include two sections 42 and 44 which are attached at flanges 46. The mold 40 also includes end caps 48 for sealing the ends of the mold 40. One of the end caps 48 includes a pressure port 50 through which the pressure within the mold 40 may be controlled.

The component parts of the rocket motor case are placed within the mold 40 by initially placing the parts within a first section 42 of the mold 40. A bladder 52, as illustrated in FIG. 4, may then be positioned within the interior of the component parts of the rocket motor case. The second section 44 of the mold 40 is then installed and secured to section 42 by aligning the flanges 46 and securing the flanges 46 with bolts 54 and nuts 56, as illustrated in FIG. 3, or by other conventional means known in the art.

After securing together sections 42 and 44 of mold 40, the bladder 52 is positioned with its end 58 secured between the shoulder 60 on the end caps 48 and the corresponding shoulder 62 on locator 36. As illustrated in FIG. 4, locators 36 are installed onto the ends of the metal shell 30 with bolts 38, thereby ensuring proper axial alignment of the shell 30 with respect to the mold 40. Thus, with the two sections 42 and 44 of mold 40 secured together, each end 58 of bladder 52 is sealed between the shoulder 60 on the end cap 48 and the corresponding shoulder 62 on closure adaptor 36.

The two sections 42 and 44 of mold 40 are preferably secured together such that the mold will prevent the secretion of any of the resin 20 through the slots 32 in shell 30. However, the sections 42 and 44 are not attached to each other with an air-tight seal. Consequently, any pockets of air which are trapped within the mold may escape at the seam provided at flanges 46 (FIG. 3). To further accommodate the escape of entrapped air from within the mold, the interior of the mold is preferably rough machined, thereby preventing an air-tight seal from occurring between the mold 40 and the metal shell 30.

As an alternative to employing a mold 40, the slots 32 within the metal case 30 may be sealed by another means. Since the principal function of mold 40 is to prevent the resin 20 from secreting through slots 32 before the resin cures, alternate methods which accomplish this function are within the scope of the present invention. Such methods may include sealing the slots with a material which replaces none of the destroyed hoop strength of the metal shell 30. Alternatively, it may be preferable to configure the slots 32 into the metal shell 30 after the composite liner 12 has been cured and bonded to the shell 30.

With the mold 40 assembled about the components of the hybrid case, curing of the composite liner 12 may be accomplished, thereby binding the liner 12 to the metal shell 30 and to the insulation 34. Initially, the mold 40 is pressurized via pressure port 50 an amount sufficient to force the bladder 52 against the inside surface of the layer of insulation 34, as illustrated in FIG. 4. In accordance with a presently preferred method, the interior of the mold 40 is pressurized to approximately five psi in this step.

While maintaining this initial pressure within bladder 52, the liner 12 is heated to a cure temperature. Liner 12 may be heated by placing the mold 40 and its contents within an oven 70. Alternatively, a mold employing heating coils may be utilized to supply heat to the liner 12. Depending on the mass of the tooling employed, an hour or two may be required for the heat of the oven to penetrate the mold and uniformly heat the liner 12 to the temperature within the oven (the cure temperature). With a liner made from an Amoco ERL-1908 resin, a curing temperature of approximately 300 degrees Fahrenheit is suitable.

With the liner 12 uniformly heated to the cure temperature, the viscosity of the resin 20 in the liner 12 is significantly decreased. Thus, the shape of the liner 12 may be easily deformed. Because the liner 12 is made of several sheets of reinforced composite material, as the bladder 52 is pressurized, the circumference of the liner 12 will expand to conform to the inside diameter of the metal shell 30.

The expansion of the circumference of liner 12 will result in a corresponding decrease in the amount of overlap of each sheet. Additionally, because of the low viscosity of the resin at the cure temperature, any localized build up of resin due to overlap of the sheets 14 of composite material will be distributed evenly throughout the circumference of the liner.

The liner 12 should be formed such that the amount of circumferential expansion of the liner 12 to fit the inside surface of the metal case 30 is minimized. If significant expansion of the liner 12 is required, reduced strength in the liner may result. It is presently preferred that for an eight-inch diameter case, the liner 12 be formed such that its diameter need not increase more than approximately 0.10 inches to bond to the inside surface of the metal case 30.

The liner 12 is pressed against the metal shell 30 by further increasing the pressure within the bladder 52 via pressure port 50, thereby expanding the liner 12 and forcing it firmly against the interior walls of metal shell 30. In accordance with a presently preferred method, the pressure within the bladder 52 is increased from approximately five psi to approximately 50 psi during this step.

With the pressure within the bladder 52 increased, the layer of insulation 34 is also forced against the interior walls of the liner 12. The pressure and temperature within the mold 40 are maintained at these described levels until the resin 20 within the liner 12 is cured. For the embodiment described herein, curing of the liner 12 requires approximately four hours. As the liner 12 cures, the mold 40 acts as an autoclave for consolidating and curing the composite liner 12.

As the resin in the composite liner 12 cures, the liner 12 bonds to the metal shell 30 and to the layer of insulation 34. After the liner 12 is cured, the pressure within the bladder 52 may be released and the mold 40 disassembled. The composite/metal hybrid rocket motor case 72 is now complete.

Figure 5:
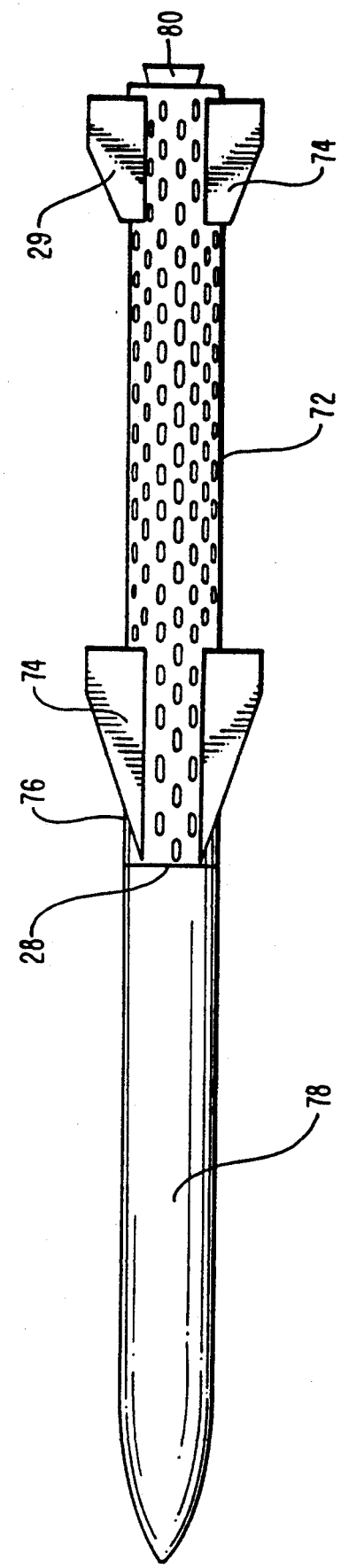
FIG. 5 is a plan view of a rocket motor employing the composite/metal hybrid rocket motor case of the present invention.

Following cure of the composite material, the completed case 72 may then be filled with propellant according to methods known in the art. As illustrated in FIG. 5, fins 74, launch lugs 76, a payload 78 and a nozzle 80 may all be attached to the case 72 by conventional methods.

As indicated above, substantially all of the hoop strength of the composite/metal hybrid case 72 is supplied by the composite liner 12. Because the composite liner 12 is a discontinuously reinforced "tape-rolled" liner and not a continuously reinforced filament wound liner, as is the conventional practice in the art, one of skill in the art would anticipate that such a discontinuously reinforced, tape-rolled liner 12 would have to include a substantially greater amount of composite material to have strength equal to that of a similarly shaped, continuously reinforced, filament wound liner.

Contrary to expectation, however, upon burst testing several composite cases made according to the teachings of the present invention, test results reveal that the tape-rolled composite cases of the present invention have substantially the same hoop strength as filament wound cases. The dominant mode of failure of the tape-rolled cases tested was full-length failure along the seam of the outermost sheet 14 of composite material.

The slotted metal shell utilized in combination with the composite liner enables the composite/metal hybrid case 72 to pass Insensitive Munitions cookoff tests, as is currently required of many tactical rocket motors. As the case heats up, the composite liner thermally degrades, thereby depleting the ability of the liner to contain pressure. The existence of slots in the metal shell of the case 72 prevent the shell from containing pressure. Consequently, the composite/metal hybrid liner 72 is insensitive to cookoff tests.

Additionally, because the exterior of the case 72 is made of metal, the rocket motor case of the present invention will withstand the heat generated at the skin of the rocket motor as a result of the substantial velocities of travel to which rocket motors are subjected.

The rocket motor case of the present invention will also pass Insensitive Munitions bullet and fragment impact tests as a result of the unique combination of the slotted metal shell and the composite liner. The metal shell provides the case 72 with the durability to be damage resistant when subjected to the handling abuses and impact forces which such rocket motors typically have to endure.

The high strength of the composite liner enables the amount of composite materials utilized in the liner to be kept to a minimum and permits a thin-walled metal shell to be employed. Thus, the case 72 is light weight, facilitating the handling of a rocket motor made from the case, while preserving the strength needed to provide acceptable performance.

The metal shell utilized on the exterior of the case 72 enables fins, end closures and other attachable parts to be easily and readily attached to the case by employing known, reliable attachment methods.

The unique methods of producing the hybrid case of the present invention enable labor, time and materials cost to be significantly reduced over other methods involving the use of composite materials. Additionally, the utilization of complex and expensive machinery in the manufacture of the case, such as that required in the manufacture of filament wound composite cases, is avoided.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A case for a rocket motor, comprising:
   a cylindrical, metal shell having a plurality of apertures;
   a cylindrical, fiber reinforced plastic liner attached to the interior of said shell; and
   a layer of insulative material attached to the interior of said plastic liner.

2. A case for a rocket motor as defined in claim 1, wherein said fibers within said plastic liner are discontinuous.

3. A case for a rocket motor as defined in claim 1, wherein said plastic liner comprises a plurality of sheets of continuous, unidirectional fiber reinforcement bonded together by a thermoplastic resin.

4. A case for a rocket motor as defined in claim 1, wherein said metal shell is configured with fin attachments.

5. A case for a rocket motor as defined in claim 1, wherein said slots in said metal shell are substantially uniformly distributed in the metal shell.

6. A case for a rocket motor as defined in claim 5, wherein said slots are elongated with their length oriented along the axis of the metal shell.

7. A case for a rocket motor as defined in claim 1, wherein said plastic liner comprises a plurality of sheets of continuous, unidirectional fiber reinforcement bonded together by a thermoset resin.

8. A case for a rocket motor as defined in claim 7, wherein said thermoset resin comprises an epoxy polymer resin.

9. A case for a rocket motor as defined in claim 7, wherein at least one of said sheets is positioned such that said unidirectional fibers within said sheet are axially oriented such that the stiffness of the case is increased.

10. A case for a rocket motor as defined in claim 7, wherein at least one of said sheets is positioned such that said unidirectional fibers within said sheet are circumferentially oriented such that the hoop strength of the case is increased.

11. A hybrid case for a solid-propellant rocket motor, comprising:
    a cylindrical, metal shell having a plurality of slots; and
    a plurality of sheets of continuous, unidirectional fiber reinforcement bonded together by a thermoset, epoxy resin, said sheets of fiber reinforcement bonded together to form a cylindrical shape and attached as a liner to the interior of said metal shell.

12. A hybrid case for a solid-propellant rocket motor as defined in claim 11, wherein at least one of said sheets is positioned such that said unidirectional fibers within said sheet are circumferentially oriented such that the hoop strength of the case is increased.

13. A hybrid case for a solid-propellant rocket motor as defined in claim 11, wherein at least one of said sheets is positioned such that said unidirectional fibers within said sheet are axially oriented such that the stiffness of the case is increased.

14. A hybrid case for a solid-propellant rocket motor as defined in claim 11, wherein said slots in said metal shell are substantially uniformly distributed in the metal shell.

15. A hybrid case for a solid-propellant rocket motor as defined in claim 11, wherein said slots are elongated with their length oriented along the axis of the metal shell.

16. A hybrid case for a solid-propellant rocket motor as defined in claim 11, further comprising fin attachments attached to said metal shell.

17. A hybrid case for a solid-propellant rocket motor as defined in claim 11, further comprising a layer of insulative material attached to the interior of said liner.

* * * * *